US006473676B2

(12) United States Patent
Katz et al.

(10) Patent No.: US 6,473,676 B2
(45) Date of Patent: Oct. 29, 2002

(54) METHOD, APPARATUS AND COMPUTER PROGRAM PRODUCT FOR ESTIMATING AIRPLANE ATTITUDE WITH REDUCED SENSOR SET

(75) Inventors: Kenneth P. Katz, Overland Park; James J. Lehfeldt; Joseph M. Oberg, both of Olathe; William G. Sample, Paola; Ronald D. Wilson, Olathe, all of KS (US)

(73) Assignee: Honeywell International, Inc., Morristown, NJ (US)

( * ) Notice: Subject to any disclaimer, the term of this patent is extended or adjusted under 35 U.S.C. 154(b) by 18 days.

(21) Appl. No.: 09/746,316

(22) Filed: Dec. 22, 2000

(65) Prior Publication Data

US 2001/0039467 A1 Nov. 8, 2001

Related U.S. Application Data (60) Provisional application No. 60/212,114, filed on Jun. 16, 2000, provisional application No. 60/206,966, filed on May 25, 2000, and provisional application No. 60/171,721, filed on Dec. 22, 1999.

(51) Int. Cl.$^7$ ................................................. G05D 1/00
(52) U.S. Cl. ................ 701/4; 701/3; 701/7; 244/158 R; 244/171; 340/967
(58) Field of Search ............................... 701/3, 4, 5, 7, 701/11, 13; 244/75 R, 158 R, 180, 181, 182, 184, 185, 171; 340/967, 974, 975

(56) References Cited

U.S. PATENT DOCUMENTS 4,914,598 A  4/1990  Krogmann et al. ......... 364/434

5,841,537 A  11/1998  Doty ........................ 356/350

FOREIGN PATENT DOCUMENTS

DE  31 41 836 A  5/1983  ........... G01C/21/16

OTHER PUBLICATIONS

Kornfeld et al., "Preliminary Flight Tests of Pseudo–Altitude Using Single Antenna GPS Sensing", 17$^{th}$Digital Avionics Systems Conference, vol. 1, 1998.

Helfrick, *Modern Aviation Electronics*, 2d ed., Prentice Hall Career and Technology, Englewood Cliffs, NJ, 1994, Chap. 7, "Indicators," pp. 313–347.

Helfrick, *Modern Aviation Electronics*, 2d ed., Prentice Hall Career and Technology, Englewood Cliffs, NJ, 1994, Chap. 8, "Flight Control Systems," pp. 348–358.

McLean, *Automatic Flight Control Systems*, Prentice Hall Inc., Englewood Cliffs, NJ, 1990, pp. 73–97.

Merhav, *Aerospace Sensor Systems and Applications*, Springer–Verlag New York, Inc., New York, 1996, pp. 415–439.

*Primary Examiner*—Gertrude Arthur

(57) ABSTRACT

An apparatus, method and computer program product useful for supplying the pilot of an aircraft with aircraft attitude information in the event of full or partial failure of the gyroscopic system normally used to supply such data. The pitch angle, roll angle and heading angle estimates provided by the apparatus, method and computer program product can be displayed to the pilot thereby alleviating the requirement that the pilot mentally integrate such data from the remaining aircraft instruments.

49 Claims, 9 Drawing Sheets

| | ROLL AXIS $x_b$ | PITCH AXIS $y_b$ | YAW AXIS $z_b$ |
|---|---|---|---|
| ANGULAR RATES | p | q | r |
| VELOCITY COMPONENTS | u | v | w |
| AERODYNAMIC FORCE COMPONENTS | X | Y | Z |
| AERODYNAMIC MOMENT COMPONENTS | L | M | N |

| | ROLL AXIS $x_b$ | PITCH AXIS $y_b$ | YAW AXIS $z_b$ |
|---|---|---|---|
| ANGULAR RATES | p | q | r |
| VELOCITY COMPONENTS | u | v | w |
| AERODYNAMIC FORCE COMPONENTS | X | Y | Z |
| AERODYNAMIC MOMENT COMPONENTS | L | M | N |

Fig. 1

$\theta$ = EULER PITCH ANGLE
$\phi$ = EULER ROLL ANGLE
$\psi$ = EULER HEADING ANGLE

TURN COORDINATOR

Fig. 3C

HEADING INDICATOR

Fig. 3D

ATTITUDE INDICATOR

Fig. 3E

AIRSPEED INDICATOR

Fig. 3F

ALTIMETER

Fig. 3G

VSI

METHOD, APPARATUS AND COMPUTER PROGRAM PRODUCT FOR ESTIMATING AIRPLANE ATTITUDE WITH REDUCED SENSOR SET

CROSS-REFERENCES TO RELATED APPLICATIONS

This application claims priority from U.S. application Ser. No. 60/206,966 titled "Technique for Estimating Aircraft Heading with Reduced Sensor Set," filed May 25, 2000; and from U.S. application Ser. No. 60/171,721 titled "Method and Apparatus for Estimating Airplane Attitude with Reduced Sensor Set," filed Dec. 22, 1999; and from U.S. application Ser. No. 60/212,114 titled "Technique for Limiting Roll Attitude Drift During Turns in AHRS Applications," filed Jun. 16, 2000, the entire specifications of each which are herein incorporated by reference

BACKGROUND OF THE INVENTION

This application relates to aircraft control systems and more particularly to aircraft attitude estimation with reduced or compromised sensor data.

Figure 1:
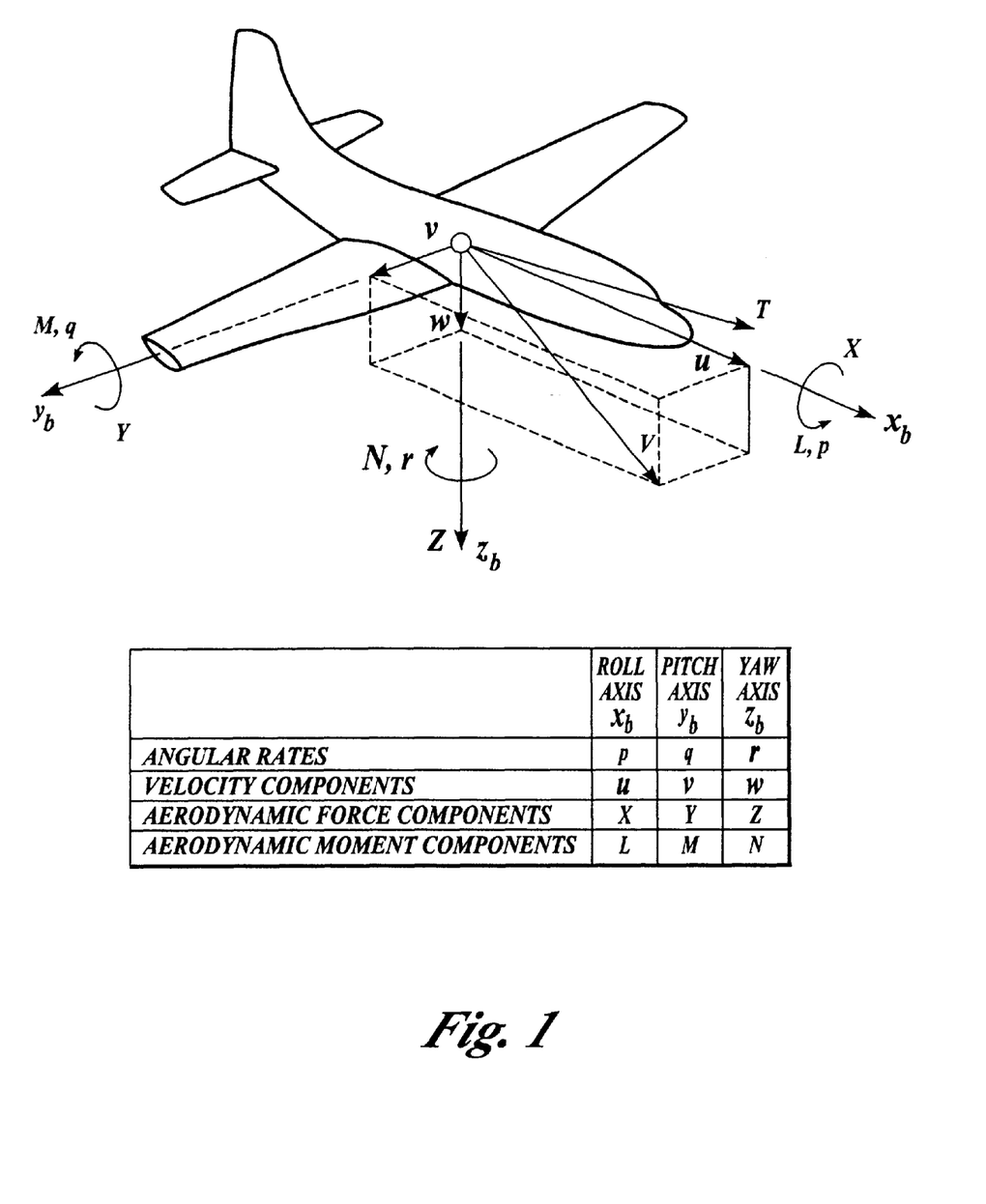
FIG. 1 is an aircraft coordinate system useful understanding the present invention.

An aircraft is a vessel that is free to move in three dimensional space. FIG. 1 depicts a typical coordinate system useful for describing aircraft motion in three dimensions. In the body fixed coordinate system of FIG. 1, the aircraft has a longitudinal axis $x_b$ which extends along the length of the airplane. Rotation about the $x_b$ axis, L, is called roll. The coordinate system of FIG. 1 further includes a lateral axis $y_b$ extending parallel to the aircraft wing. Rotation about the $y_b$ axis, M, is called pitch. The $z_b$ axis extends perpendicular to the remaining axes as shown. Rotation about the $z_b$ axis, N, is called yaw.

Figure 2:
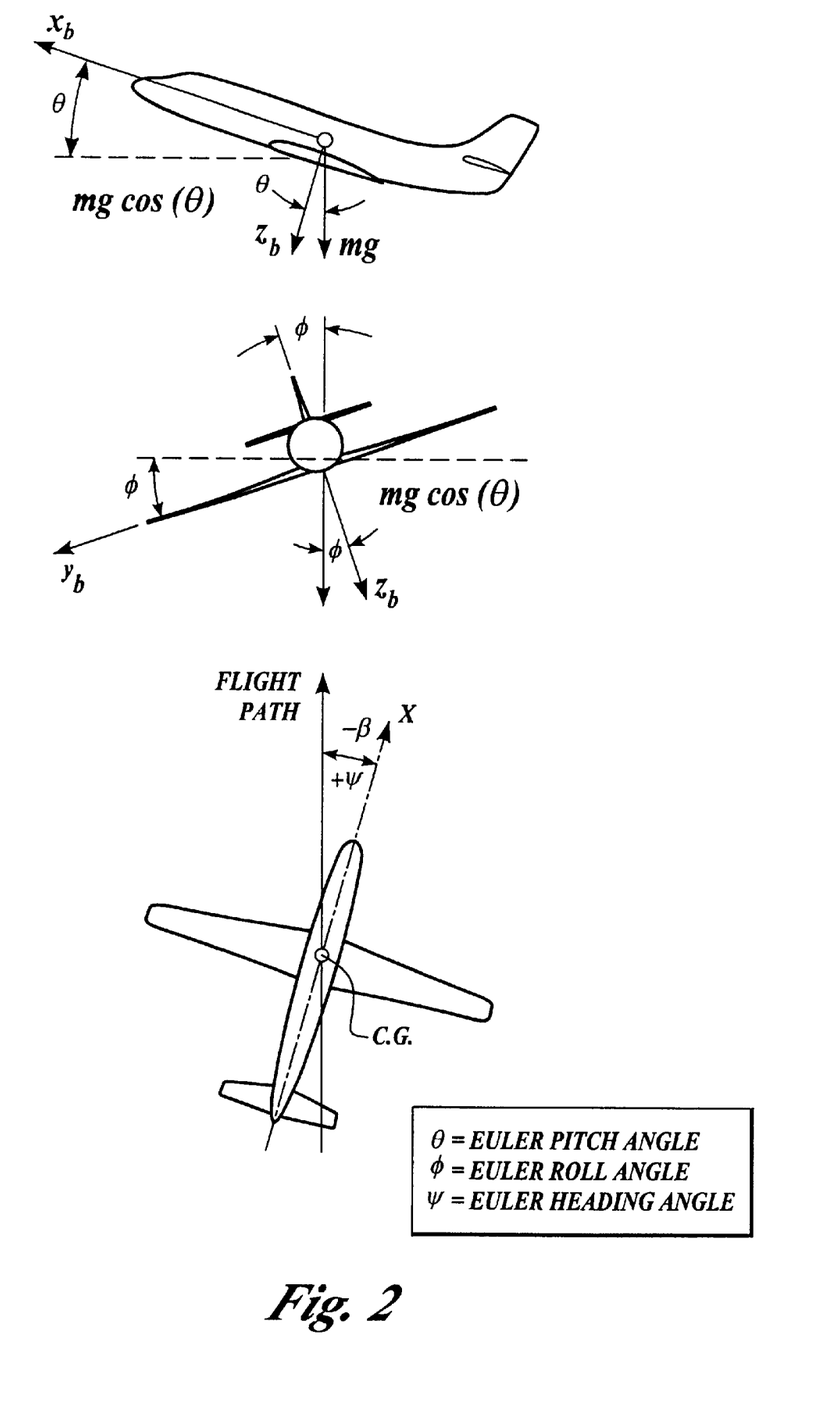
FIG. 2 is an illustration of Euler angles useful for understanding aircraft motion and nomenclature used in the description of the present invention.
Figure 3A:
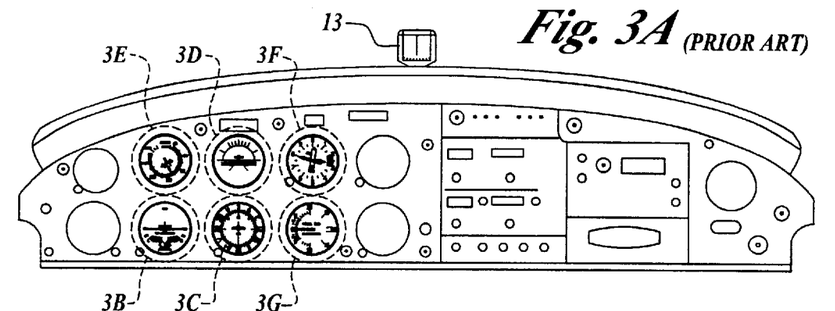
FIGS. 3A–3G are illustration of a conventional aircraft instrument panel.
Figure 3B:
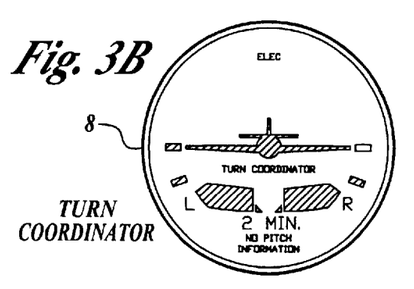
Figure 3C:
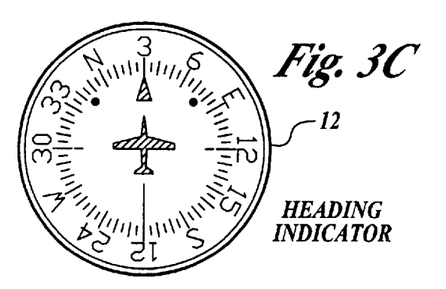
Figure 3D:
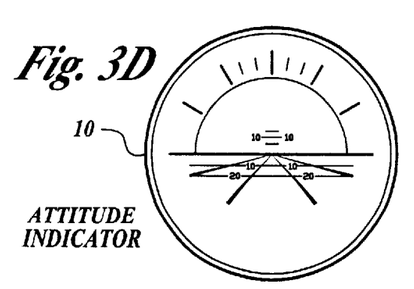
Figure 3E:
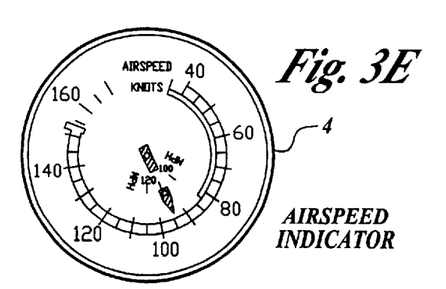
Figure 3F:
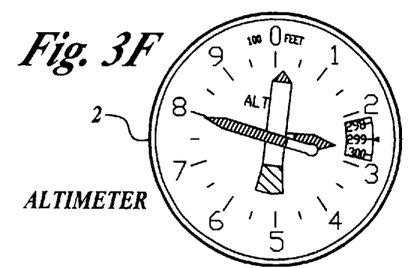
Figure 3G:
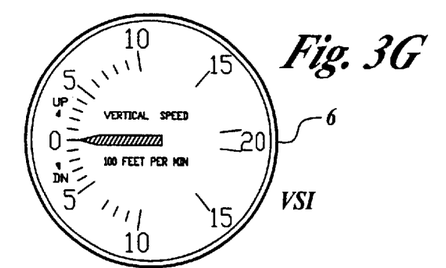

Equations of motion can be derived to describe the aircraft movement using the axes shown in FIG. 1. Unfortunately, the orientation and position of the aircraft in space cannot be truly understood with the coordinate system of FIG. 1 since the coordinate system is moving with and is always centered on the body of the aircraft. For this reason, it is common to transform the parameters of FIG. 1 to describe the angular displacement of the airc raft in space. These angular displacements, or Euler angles, are as shown in FIG. 2.

In good weather, under visual flight conditions, pilots of conventional aircraft control the aircraft motions and the resulting angular displacements in three dimensional space by visual reference to the natural horizon. The natural horizon serves as a visual clue from which the pilot can determine if the airplane is climbing, descending or turning. In low visibility conditions, such as, for example: nighttime, haze, or flight in clouds; the natural horizon can become obscured and the pilot is unable to control the aircraft by reference to the natural horizon. Conventional aircraft are therefore equipped with several instruments to assist the pilot in visualizing the aircraft's movement in three dimensional space. These instruments also provide the pilot with supporting data from which to confirm control of the aircraft even when the natural horizon is visible.

FIGS. 3A–3G show a conventional aircraft panel for a contemporary airplane having such standard instrumentation. The control panel of FIGS. 3A–3G include: an altimeter 2 that provides the pilot with information on aircraft altitude; an airspeed indicator 4, that provides information on the aircraft speed through the air; and a vertical speed indicator 6, that provides data on the rate of climb and descent. Instruments 2, 4 and 6 comprise the pitot-static, or pneumatic, instruments since they operate by sensing air pressures exterior to the aircraft. In certain larger aircraft, the pitot static instruments sensors are combined into a single box called an air data computer. The air data computer then outputs the altimetry and airspeed data to a cockpit display and/or to other avionics equipment requiring such data.

Also included in the standard control panel of FIGS. 3A–3G are the gyroscopic instruments. The gyroscopic instruments provide the pilot with a pictorial view of the airplane's rate of turn, attitude and heading. These instruments include a turn coordinator 8, an attitude indicator 10, and a heading indicator 12. A wet magnetic compass 13, may also be used to provide heading information. Wet compass 13 does not contain a gyro.

Figure 4A:
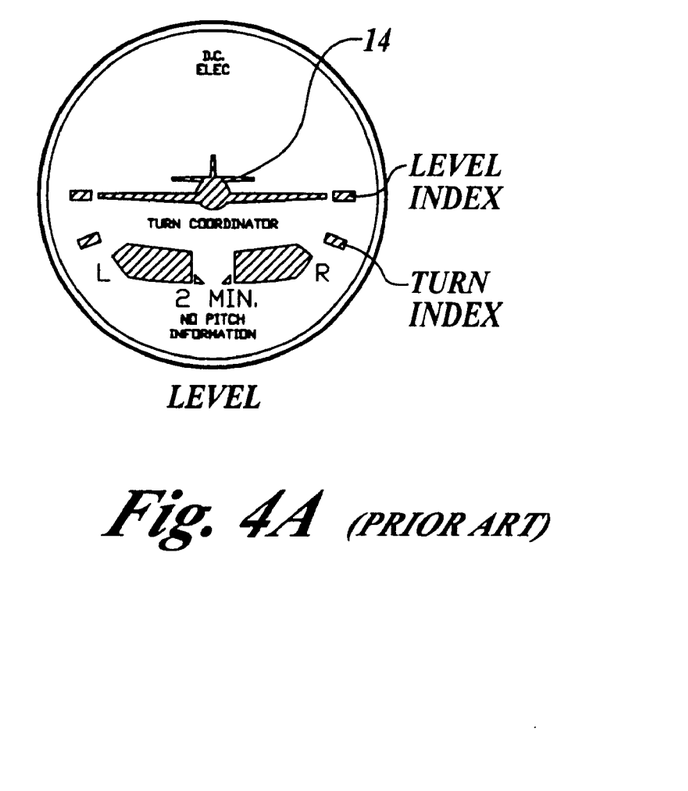
FIGS. 4A and 4B are illustrations depicting operation of an aircraft turn coordinator.
Figure 4B:
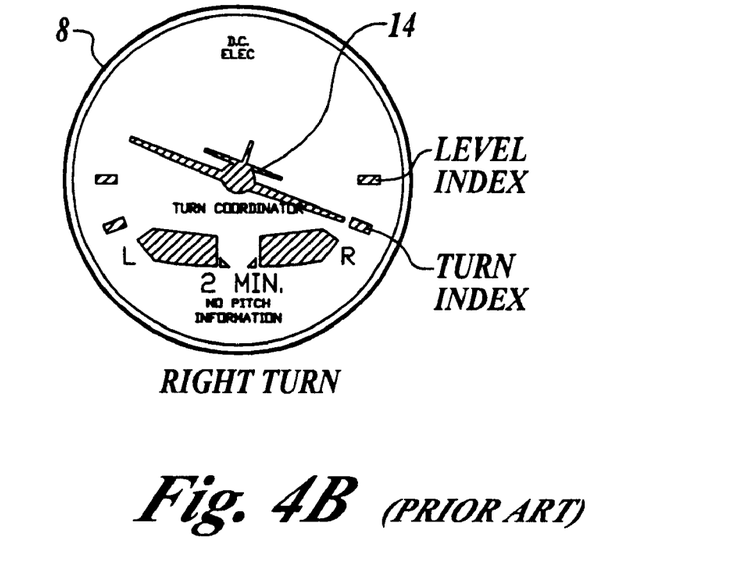

FIGS. 4A–4B illustrate aircraft turn coordinator 8 in greater detail. Turn coordinator 8 senses yaw, r, and roll, p, movement about the aircraft $Z_b$ and $X_b$ axes. When the miniature airplane 14 is level as shown in FIG. 4A, the aircraft is neither turning nor rolling. When the aircraft banks, miniature airplane 14 also banks. In the drawing of FIG. 4B, miniature airplane 14 indicates a turn to the right.

Figures 5A, 5B:
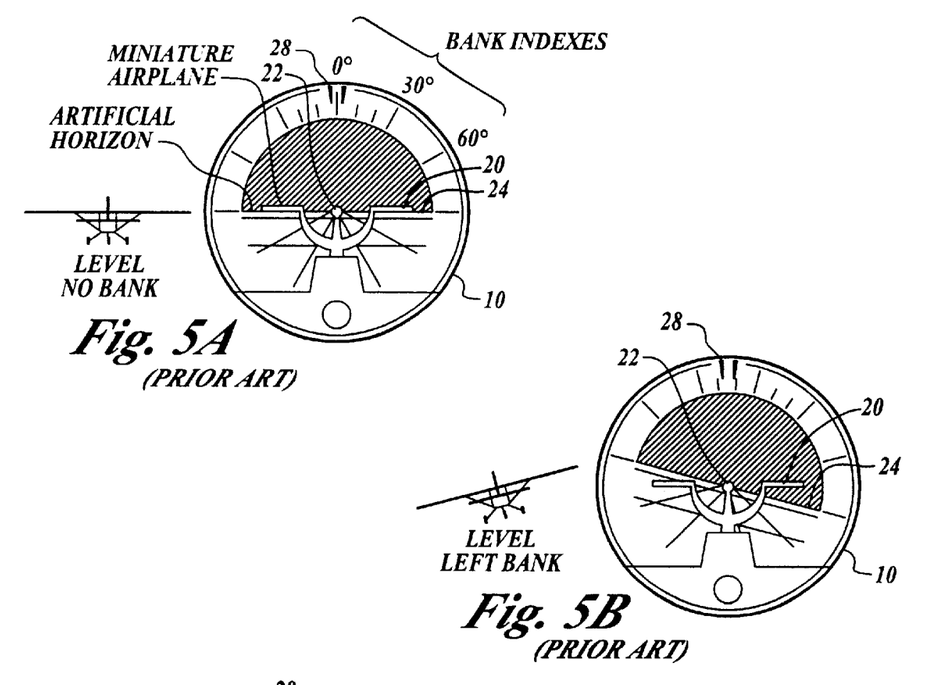
FIGS. 5A–5D are illustrations depicting operation of an aircraft attitude indicator.
Figure 5C:
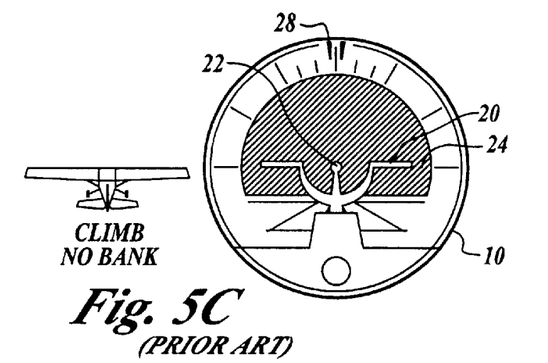
Figure 5D:
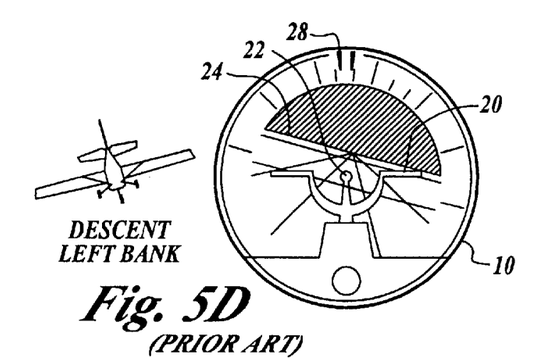

FIGS. 5A–5D illustrate operation of aircraft attitude indicator 10 also known as an artificial horizon. Attitude indicator 10 senses pitching, $\Theta$, and rolling, $\phi$, movements at out the airplane's lateral and longitudinal axes. Attitude indicator 10 is the only flight instrument that provides both pitch and bank information to the pilot. Attitude indicator 10 presents a view of the aircraft, as represented by miniature airplane 20, as the aircraft would appear to someone standing behind it. The pitch attitude of the aircraft is shown by noting the position of the nose 22 of miniature airplane 20 relative to the artificial horizon 24. Bank information is shown both by noting the position of miniature airplane 20 relative to the deflected artificial horizon 24 and by the alignment of bank angle pointer 28 with the graduated bank angle indexes located on the perimeter of the device. FIG. 5A shows the aircraft in level flight and no turn. FIG. 5B shows the aircraft in a level turn to the left. FIG. 5C shows a level climb and FIG. 5D shows a descending left turn.

Heading indicator 12, also known as a directional gyro, serves as a means to indicate the aircraft magnetic heading without the limitations of using wet compass 13. Wet compass 13 is prone to various turning and acceleration errors due to the interaction of the magnetic compass with the earth's magnetic field. Heading indicator 12 is not subject to these errors and thus provides the pilot with a more stable indication of aircraft heading throughout the flight.

Each of turn coordinator 8, attitude indicator 10, and heading indicator 12 includes a gyroscope needed for proper operation of these instruments. Typically, the gyroscopes in attitude indicator 10 and heading indicator 12 are powered by a vacuum pump. Turn coordinator 8 is normally powered using an electric motor. The gyroscopes contained within each of these instruments also have operating limitations. For example, if the aircraft enters an extreme or unusual flight attitude, the gyroscope can tumble rendering the associated instrument inoperative.

Similar to the air data computer, the gyroscopic instruments are occasionally on larger aircraft combined into a single integrated sensor package called an attitude heading reference system, or AHRS. The AHRS system outputs the attitude data to a cockpit display and to other avionics equipment requiring such data.

If either the gyroscope within the individual AHRS sensor instrument or the power source for the AHRS gyro instrument fails, the pilot no longer can rely on the affected instrument(s) for navigation and control of the aircraft. In such situations, pilots are taught to fly "partial panel" in which the pilot mentally integrates information from the remaining instruments to supply the information normally supplied by the missing instrument. This mental integration task is demanding, especially for an inexperienced or out of practice pilot. Numerous accidents have resulted when the pilot was forced to fly partial panel.

In airplanes with autopilots, the autopilot uses the attitude information supplied by these gyroscopic instruments to fly the aircraft. In certain aircraft, without redundant instrumentation, these gyroscopes supply the only sensor inputs used to operate the autopilot. Thus, when an instrumentation failure occurs, the autopilot becomes inoperable as well.

SUMMARY OF THE INVENTION

The present invention recognizes that in the event of instrument failure, it would be desirable to supply the pilot with estimates of the omitted information such that the pilot is not required to perform the mental integration task. The present invention thus contributes to improved aircraft safety by reducing pilot workload and fatigue in the event of instrument failure.

The present invention further enables continued autopilot operation in the event of a single gyro or entire gyro system failure. The architecture of the present invention thus enhances the robustness of the autopilot without the added weight, cost and maintenance expense of a redundant sensor set.

The present invention also provides a back up system to the AHRS system when the aircraft is so equipped. According to one aspect of the present invention, the invention provides a method, apparatus and computer program product useful for estimating airplane pitch, roll and heading angles using a reduced set of sensors. The present invention exploits characteristics of aircraft kinematics, together with sensor characteristics, filtering and estimation techniques as well as simplifying assumptions based on flight regime to obtain angular estimates desired by the pilot for continued controlled operation of the aircraft.

According to another aspect of the invention, the invention includes a signal processing device further including logic, either software and/or hardware, for estimating aircraft roll angles, pitch angles and heading angles. Each angle estimator is coupled to a suite sensors from which the desired angle may be estimated in the absence of sensor data directly measuring that angle. The sensors may be integrated with the present invention or located separately onboard the aircraft.

According to another aspect of the present invention, the invention additionally includes an interface for displaying the angular estimates obtained to the pilot. In a preferred embodiment of the invention, this interface may comprise an electronic cockpit display, a driver for displaying ansular data on an existing cockpit display and/or a converter for driving a mechanical ansular display instrument existing in the cockpit.

According to still another aspect of the present invention, the roll angle, pitch angle and heading angle estimators may be separate units and need not be bundled as an integrated package.

Further details and operation of the invention are described below.

DESCRIPTION OF THE SPECIFIC EMBODIMENTS

Figure 6:
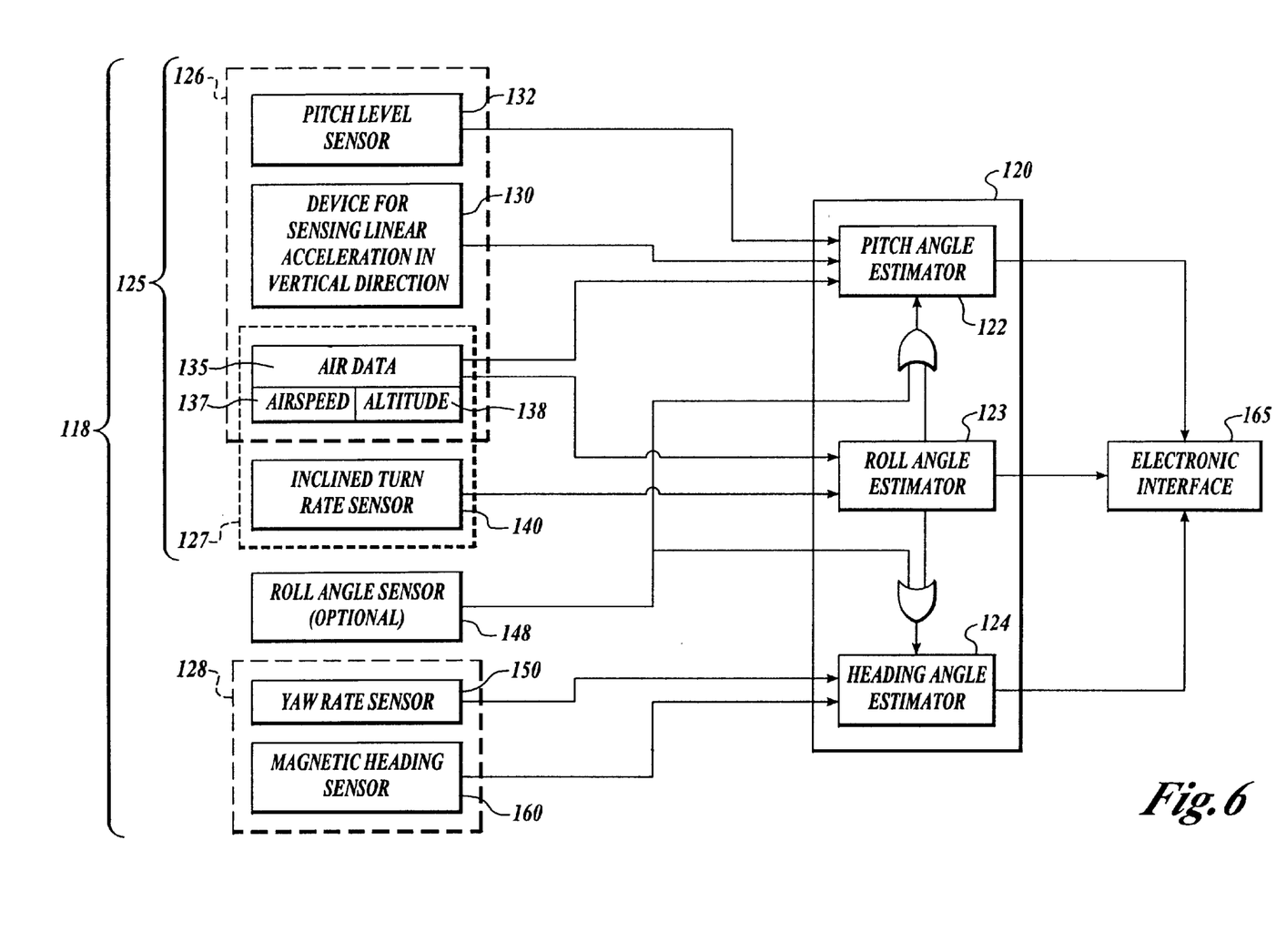
FIG. 6 is a block diagram of a system for estimating roll, pitch and heading angles according to a preferred embodiment of the present invention.

The present invention provides an apparatus, method and computer program product for estimating roll angle, pitch angle, and/or heading angle in the event of full or partial failure of the gyroscopic system, including the AHRS system if so equipped that normally supplies such data. FIG. 6 is a system level block diagram useful for understanding implementation of the present invention. In the embodiment of FIG. 6, a signal processing device 120 is employed to process data signals received from sensors 118 to obtain the desired angle estimates. Signal processing device 120 may comprise an analog circuit, a microprocessor, a digital logic circuit, executable code or any combination thereof. In a preferred embodiment of the invention, device 120 comprises a pitch angle estimator 122, a roll angle estimator 123 and a heading angle estimator 124.

Sensor suite 118 may be logically subdivided into two categories, delineated in FIG. 6 by reference numerals 125 and 128. Sensors contained within logical grouping 125 provide those inputs to device 120 useful for obtaining pitch angle and roll angle estimates and may be therefore further subdivided into logical groupings 126 and 127 respectively. These sensors include a device 130 for sensing linear acceleration in the vertical direction and an pitch level sensor 132. In one preferred embodiment of the invention both device 130 and sensor 132 comprise single axis accelerometers which may be housed as a single component. Also preferably included in sensor suite 125 is a source of air data 135 which supplies airspeed information 137 and/or altimetry data 138. In one preferred embodiment of the invention, air data sensor 135 preferably comprises the aircraft air data computer.

Also included in sensor suite 25 is a inclined turn rate sensor 140, such that it will sense a component of both yaw rate and roll rate, which according to one embodiment of the present invention is a turn coordinator. The output of sensor 140 in conjunction with sensor 135 is used by roll angle estimator 123 to obtain a roll angle estimate. The roll angle estimate output by estimator 123 also may also serve as input to pitch angle estimator 122 and/or heading angle estimator 124 in the event of roll angle gyro system failure. If the aircraft primary roll rate sensor remains operative, the input from roll angle gyro 148 may be used as input to estimators 122 and 124 in lieu of using the roll angle estimator 123 output.

Sensor suite 128 comprises those sensors used by heading angle estimator 124 to obtain a heading angle estimate. Sensor suite 128 includes a yaw rate sensor 150 and a magnetic heading sensor 160. In a preferred embodiment of the invention, yaw rate sensor 150 comprises a yaw rate gyro, while magnetic heading sensor 160 is preferably a flux gate. Heading angle estimator 124 also receives a roll angle input from estimator 123 or roll angle sensor 148 in the manner previously described.

The pitch angle, roll angle and/or heading angle estimates output by signal processor 120 are output to an electronic interface 165. Electronic interface 165 may be an electronic cockpit display for displaying the angle information directly to the pilot. Optionally, electronic interface 165 may comprise an intermediary device for converting the signals output by signal processing device 120 into a data format used by the aircraft avionics data bus for later display on a separate electronic cockpit display (not shown); for use by other avionics systems requiring such data; or to convert the electronic signals to a form useful for driving aircraft mechanical cockpit indicators.

Note that the system of FIG. 6 is modular in nature and can be implemented as a complete integrated system as shown or can be subdivided and implemented as any individual one of or as all three separate estimation modules. For example, each of angle estimators 122, 123 and 124 may be constructed and sold as discrete individual units in conjunction with or with provisions to be coupled to sensors 126, 127 or 128 as appropriate. Furthermore, the system of FIG. 6 can be configured to output only those angle estimates specifically desired. For example, in the event the directional gyro fails, only heading angle estimator 24 need be activated.

The theory operation and construction of each of estimators 122, 123 and 124 are described in greater detail below. As will be readily apparent to those of skill in the art, the specific mechanizations of estimators 122, 123 and 124 described below represent a preferred embodiment of the invention. Mechanizations other than those shown are possible using the teachings of the present invention.

Roll Angle Estimation

In normal flight operations, pilots turn the aircraft by executing a roll to a bank angle, then a coordinated turn holding a constant bank angle, followed by a roll in the opposite direction to exit from the turn.

The lateral force for such a maneuver equation may be written generally as:

$$Y + mg\cos\Theta \sin \Phi = m(\dot{v} + r\, u + p\, w) \tag{1}$$

Simplifying assumptions can be made for small Euler angle excursions and coordinated tuning flight. Specifically:

$$Y = 0 \quad \text{(no side force)} \tag{2}$$

$$\Theta \approx 0 \Rightarrow \cos\Theta \approx 1 \quad \text{(small pitch angle)}$$

$$\dot{v} = 0 \quad \text{(no sideslip)}$$

$$w = 0 \quad \text{(constant altitude, small angle of attack)}$$

$$\sin\Phi \approx \Phi \quad \text{(small roll angle)}$$

Substituting these simplifying assumptions (2) for the steady state coordinated banked turn into the lateral force equation (1) reduces to:

$$\hat{\Phi} = \frac{r \cdot u}{g} \tag{3}$$

For the rolling maneuvers entering and exiting the turn, the equation for the body frame angular velocity around the aircraft longitudinal axis may be written as:

$$p = \dot{\Theta} - \dot{\Psi}\ast \sin\Theta \tag{4}$$

As for the steady state coordinated banked turn, the following simplifying assumption can be made:

$$\Theta \approx 0 \Rightarrow \sin\Theta \approx 0 \quad \text{(small pitch angle)} \tag{5}$$

Substituting equation (5) into the body frame angular velocity equation (4) yields:

$$\dot{\hat{\Phi}} = p \tag{6}$$

Equations (3) and (6) together are sufficient to calculate the estimated roll angle of the aircraft throughout the turn maneuver. In a preferred embodiment of the invention, airspeed as measured by the air data system is assumed to be essentially equal to $u$. The gravitational acceleration constant g is known. Examination of equation (3) reveals that the roll velocity, r, remains to be measured. Thus, roll angle $\Phi$ can be estimated using only an angular rate sensor with a tilted axis and an airspeed measurement.

Given an inclined turn rate sensor with the axis tilted at constant angle $\Theta_G$, the sensor output G may be expressed as:

$$G = p \sin\Theta_G + r \cos\Theta_G \tag{7}$$

Rearranging equation (3) to solve for r, and then substituting equations (3) and (6) into equation (7) yields:

$$G = \dot{\hat{\Phi}} \cdot \sin\Theta_G + \frac{\hat{\Phi} \cdot g}{u} \cdot \cos\Theta_G \tag{8}$$

As known to those of ordinary skill in the art, the expression for G is a differential equation that can be transformed into the Laplace domain. Equation 8 can thus be rewritten in Laplace form as:

$$G(s) = s\hat{\Phi}(s) \cdot \sin\Theta_G + \hat{\Phi}(s) \cdot \frac{g \cdot \cos\Theta}{u} \tag{9}$$

$$= \hat{\Phi}(s)\left(s \cdot \sin\Theta_G + \frac{g \cdot \cos\Theta}{u}\right)$$

Rearranging equation (9) solving for $\Phi(s)$:

$$\hat{\Phi}(s) = G(s) \cdot \left(\frac{u}{s \cdot u \cdot \sin\Theta_G + g \cdot \cos\Theta_G}\right) \tag{10}$$

As will be recognized by those of ordinary skill in the art, equation 10 is now an expression in transfer function form which can be solved numerically over time, rewritten and solved in state-space form, or implemented as a feedback control loop.

Figure 7:
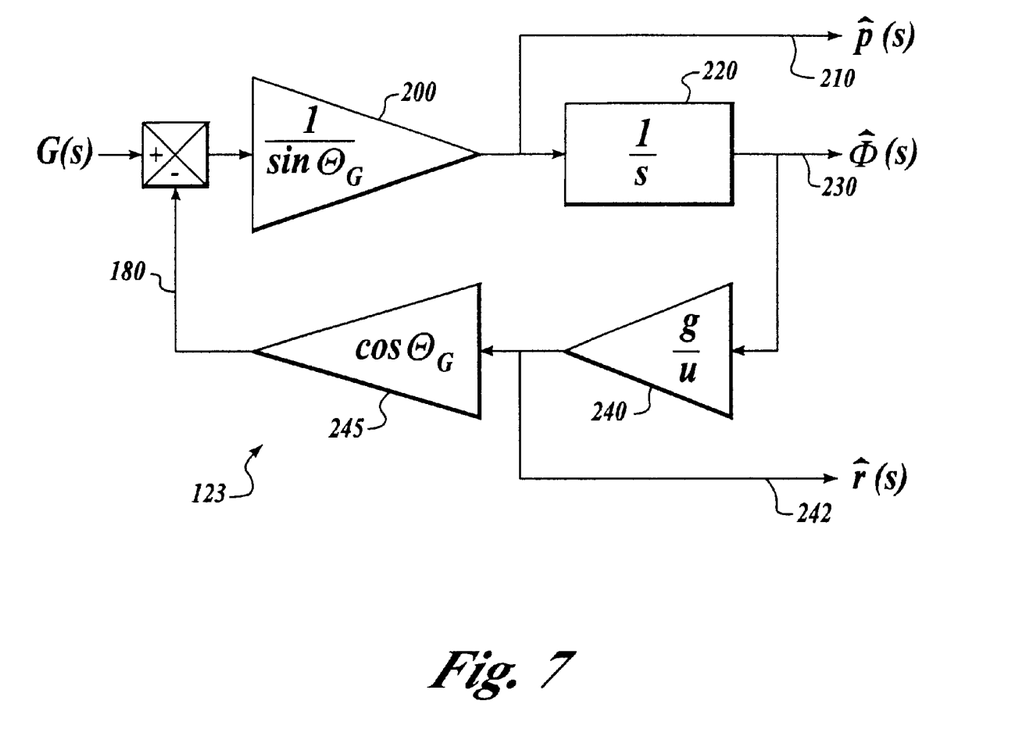
FIG. 7 is a block diagram of a roll angle estimator according to a preferred embodiment of the invention.

FIG. 7 contains a block diagram for implementing the roll angle estimator according to a preferred embodiment of the present invention. In the feedback control loop of FIG. 7, the output G (s) of the canted angular signal rate sensor is input the system and summed with the feedback loop 180 before being amplified in amplifier 200 by gain $1/\sin\Theta_G$. The output of amplifier 200 is fed to output 210 as roll rate p̂ (s) and to integrator 220. The output of integrator 220 is in turn fed to amplifier 240 having gain g/u. The output of amplifier 220 is used as output r̂ (s) on terminal 250 and is also fed to amplifier 260. The output of amplifier 260 forms feedback signal 180. As will be readily apparent to those of skill in the art, the feedback loop of FIG. 7 may be, for example, implemented as an analog circuit in the manner described above, as executable software, solved numerically or implemented as a digital circuit. The present invention is not limited to a particular implementation.

The typical predominant error characteristic of angular rate sensors is bias. Thus, the sensor outputs the true valve plus some small error, or bias. In the present invention, the roll angle estimate $\hat{\Phi}(s)$ is linearly proportional to the angular rate sensor input G(s). The estimation method and apparatus of the present invention does not integrate the bias and therefore the roll angle estimate error will be bound for a bounded sensor bias error.

Thus for flight envelopes within which the simplifying assumptions are valid, the roll angle estimate $\Phi$, roll rate estimate, p and yaw rate estimate, r can be calculated with only two sensors: an airspeed sensor and an inclined turn rate sensor as shown by the block diagram of FIG. 7.

Pitch Angle Estimation

The equation for earth frame vertical velocity is:

$$\dot{z} = -\sin\Theta \cdot u + \sin\Phi \cdot \cos\Theta \cdot v + \cos\Phi \cdot \cos\Theta \cdot w \tag{11}$$

By definition:

$\dot{h} = -\dot{z}$ (rate of change of altitude)

$$\alpha = \sin^{-1}\left(\frac{w}{u}\right) \quad \text{(angle of attack)} \tag{12}$$

For flight with small pitch angles, small angle of attack and no sideslip the following simplifications can be made:

$$\Theta \ll 1 \Rightarrow \sin\Theta \approx \Theta, \cos\Theta \approx 1 \quad \text{(small pitch angle)} \tag{13}$$

$\alpha \ll 1 \Rightarrow \sin \approx \alpha$ (small angle of attack)

$v = 0$ (no sideslip)

Substituting the definitions (12) and simplifying assumptions (13) into the velocity transformation equation (11), and then solving for $\Theta$ yields:

$$-\dot{h} = -\Theta \cdot u + \cos\Phi \cdot w \tag{14}$$

$$\frac{\dot{h}}{u} = \Theta - \frac{w}{u} \cdot \cos\Phi$$

$$\Theta = \frac{\dot{h}}{u} + \alpha \cdot \cos\Phi$$

By definition $$\gamma = \sin^{-1}\left(\frac{\dot{h}}{u}\right) \tag{15}$$

For the flight regimes of interest, the following additional simplifying assumption can be made:

$$\dot{h} \ll u \Rightarrow \sin^{-1}\left(\frac{\dot{h}}{u}\right) \tag{16}$$

Substituting equation (16) into equation (14) yields:

$$\Theta = \gamma + \alpha\cos\Phi \tag{17}$$

The parameters ḣ and u are sensed by the air data system. The rate of altitude change, ḣ, is calculated from h or measured directly from vertical speed indicator 6. The calculation can be executed either in the air data system or the pitch estimation algorithm. Both the calculation process for ḣ and measurement of ḣ using pneumatic systems such as vertical speed indicator 6 introduce a lag which makes precise control of the aircraft more difficult. These lags can be compensated by blending measurements from a vertical accelerometer into the estimate using filtering techniques well know to those of skill in the art.

For example, in a preferred embodiment, the vertical accelerometer is brought into the pitch estimate through the use of the vertical force equation. The vertical force equation is:

$$Z + m \cdot g \cdot \cos\Theta \cdot \sin\Phi = m(\dot{w} + p \cdot v - q \cdot u) \tag{18}$$

Again, for the flight regimes of interest airplane kinematics yield the simplifying assumptions:

$$\Theta \ll 1 \Rightarrow \cos\Theta \approx 1 \quad \text{(small pitch angle)} \tag{19}$$

$w \ll q \cdot u$ (small angle of attack)

$v = 0$ (no slideslip)

Figure 8:
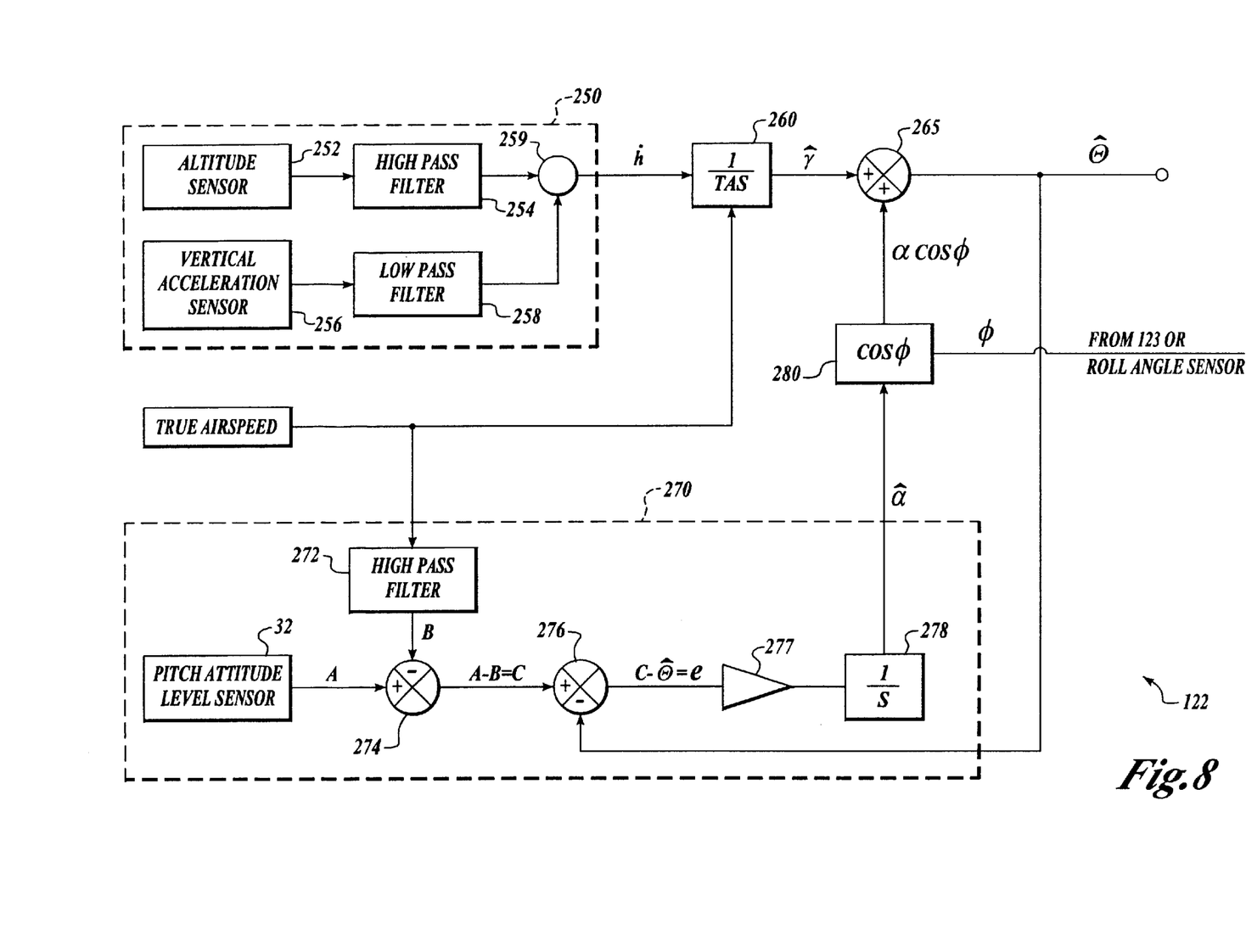
FIG. 8 is a block diagram of a pitch angle estimator according to a preferred embodiment of the invention.

Pneumatic sensors, such as altimeters and vertical speed indicators are, however, subject to lag. For this reason, according to one embodiment of the present invention as shown in FIG. 8, the present invention may also include a vertical acceleration sensor 256. Vertical acceleration sensor 256 may be implemented using an accelerometer. The output of vertical acceleration sensor 256 is sent through a low pass filter 258 which serves as a pseudo integrator of the accelerometer signal as well as introducing a time constant into the estimate of vertical speed output by sensor 256. The estimate of vertical speed output by low pass filter 258 is combined with the estimate of vertical speed output by high pass filter 254 by summer 259 to obtain a blended estimate of vertical speed.

As given by equation (15), flight angle, γ, can be estimated by dividing vertical speed by the speed u, along the $x_b$ axis. For the operating conditions of interest, u can be approximated by true airspeed, TAS. In a preferred embodiment of the invention, true airspeed can be provided by the aircraft air data computer.

The flight path angle estimate output by divider 260 is summed with the signal αcosΦ according to equation to obtain the estimated pitch attitude $\hat{\Theta}$. The angle of attack estimate provided to summing junction 265, is obtained in a feedback loop via a filter 270. Filter 270 operates to provide a stable estimate of angle of attack in both dynamic and steady state flight conditions. In the embodiment of FIG. 8, filter 270 includes pitch attitude level sensor 132. According to a one embodiment of the invention, attitude level sensor 132 comprises an accelerometer that operates in a fashion analogous to a bubble level. Sensor 132 is oriented to sense the inclination of the aircraft such that when the aircraft is level the gravity vector points straight down and the output of sensor 132 is zero. When the aircraft is at some nonzero pitch angle, the gravity vector is now canted at some non zero angle. As is known to those of skill in the art, the portion of the gravity vector which is aligned along the sensitive axis of accelerometer 132 can be sensed and converted to an angular measurement.

Sensor 132 is useful for sensing steady state pitch attitudes. However, because accelerometer 132 will also sense aircraft accelerations along the $x_b$ axis unrelated to steady state pitch conditions, the signal output from sensor 132 may contain errors during aircraft accelerations. For this reason, true airspeed is input to a high pass filter 272. High pass filter 272 operates to differentiate the airspeed signal to provide an estimate of aircraft acceleration along the $x_b$ axis. This acceleration estimate is subtracted from the output of sensor 132 by summing junction 274. The output of junction 274, labeled signal "C" in the drawing, is an analog signal or digital equivalent representative of the aircraft angle of pitch. The signal represented by signal C, is compared with the pitch estimation signal , $\hat{\Theta}$, by summing junction 276 to obtain an error signal, e. Pitch error signal e, is multiplied by a gain in amplifier 277. In a preferred embodiment of the invention, the gain is set, for example at 0.2, but is preferably set at some value which allows loop 270 to respond quickly to pilot control inputs without noticeable lag. The output of amplifier 277 is then integrated by integrator 278. Integrator 278 integrates until such time as the gain multiplied error signal is driven to zero for aircraft turns at constant altitude. The resulting output of filter 270 is a conditioned signal representative of the aircraft angle of attack, α.

The angle of attack signal is then combined with the cosine of the roll angle $\Phi$ to obtain the αcos$\Phi$ term of equation 17 used to estimate the pitch angle. In a preferred embodiment of the invention the roll angle estimate is supplied from the roll angle estimator of the present invention. Optionally, however, the roll angle can be supplied from any available sensor from which roll angle can be obtained. The combined signal output from multiplier 280 is output to junction 265 in the manner previously described above.

Heading Angle Estimation

Actual aircraft heading rate of change is a function of aircraft body axis yaw rate, aircraft body axis pitch rate, q, roll angle, $\Phi$ and pitch attitude, $\Theta$. Changes in heading art typically made by banking the aircraft and holding pitch angle constant and near zero while changing heading, such that the rate of pitch change over time, d$\Theta$/dt, is approximately zero. The present invention utilizes a yaw rate gyro, roll angle and a magnetic heading sensor to estimate actual aircraft heading. The technique for estimating the heading according to the present invention is developed from the following equations.

Equation 20 defines the Euler heading rate:

$$d\Psi/dt = \sec\Theta \, (q \sin\Phi + r \cos\Phi) \quad (20)$$

wherein:

d$\Psi$/dt —aircraft heading rate  $\Theta$—aircraft Euler pitch attitude $\Phi$—aircraft Euler roll attitude r—aircraft body axis yaw rate q—aircraft body axis pitch rate Euler pitch attitude rate is given by:

$$d\Theta/dt = q\cos\Phi - r\sin\Phi \quad (21)$$

Noting that d$\Theta$/dt is approximately zero, equation 21 can be rearranged to:

$$q\cos\Phi = r\sin\Phi. \quad (22)$$

For pitch angles less that 10 degrees, sec $\Theta$~1. Equation 21 yields:

$$d\Psi/dt = r\sin^2\Phi/\cos\Phi + r\cos\Phi \quad (23)$$

which reduces to:

$$d\Psi/dt = r/\cos\Phi \quad (24)$$

Figure 9:
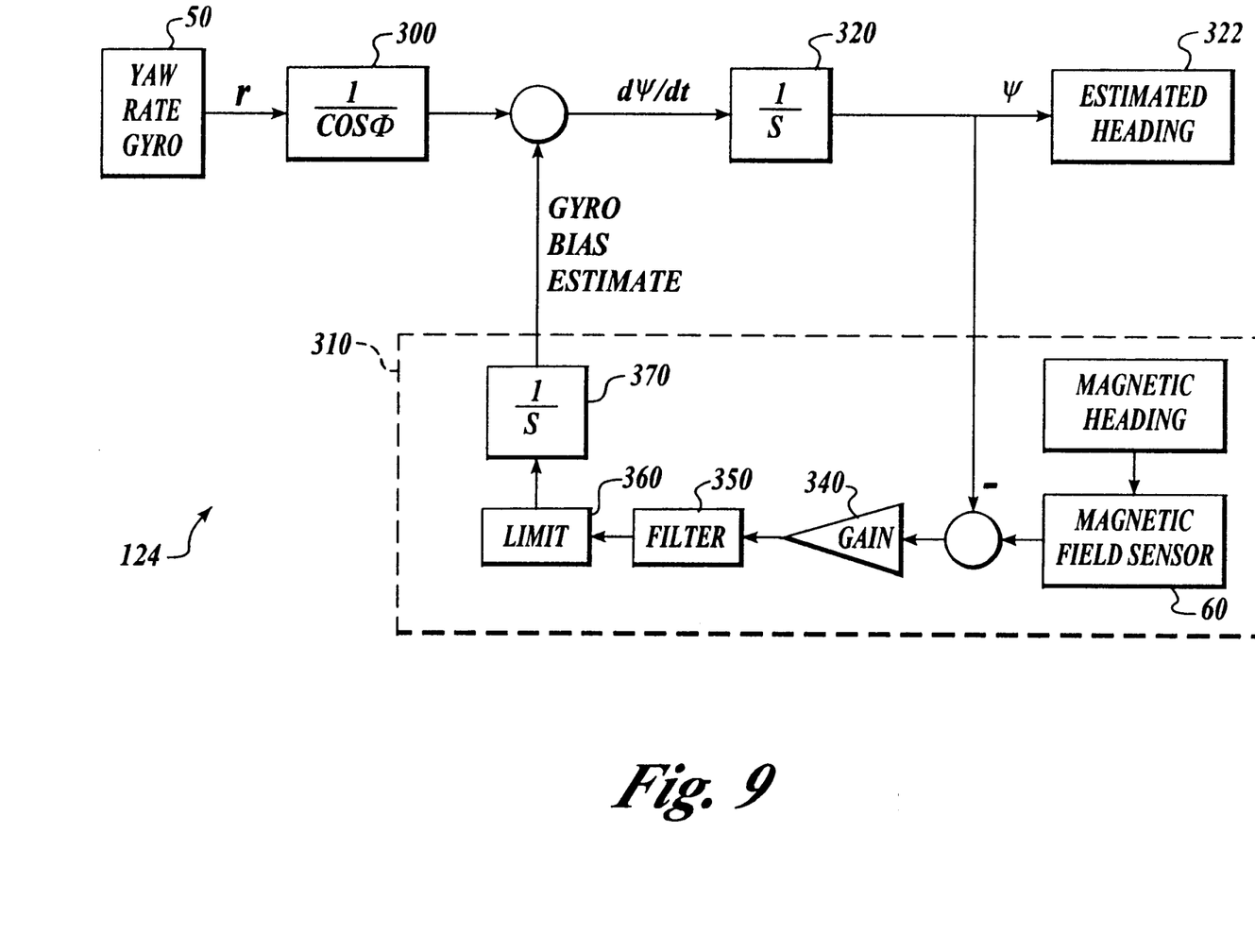
FIG. 9 is a block diagram of a heading angle estimator according to a preferred embodiment of the invention.

FIG. 9 contains a block diagram for aircraft heading estimating system according to a preferred embodiment of the invention. In the feedback control loop of FIG. 9, the body-mounted yaw rate gyro output 150 is first divided by the cosine of roll angle in block 300 and then summed with a gyro bias estimate 310. The output of this summation is then integrated by integrator 320. The output 322 of integrator 320 is the estimated heading, $\Psi$. Gyro bias estimate 310 is computed by comparing the estimated heading with the output of a magnetic sensor 330. Magnetic sensor 330 is compass or equivalent device that measures aircraft heading direction by sensing the earth's magnetic field vector in relation to the aircraft's heading. Magnetic sensor 330 may be a magnetic compass or a flux gate sensor. As known to those of skill in the art, a flux gate sensor is a three arm magnetic structure made of ferromagnetic material useful for sensing the direction of the Earth's magnetic field. The difference between the estimated heading on output 322 and the magnetic sensed heading output by sensor 330 is multiplied by a gain 340, processed by a compensation filter 350, rate limited at block 360 and integrated by integrator 370. This integrator 370 output represents the gyro bias estimate 310. In the embodiment of FIG. 9, the estimated heading is forced to track the magnetic heading sensor 330 in the long term. In the short term, the estimated heading is obtained from integrating the processed yaw rate gyro 150. Magnetic heading sensor 330 provides good long term heading accuracy but is subject to errors during aircraft turns. Yaw rate gyro 150 and associated integration provides good short term heading but is subject to drift in the longer term. The two sensors thus work in complimentary fashion to minimize errors in the estimated heading.

The preferred embodiments of the invention have been described. Variations and modifications will be readily apparent to those of ordinary skill in the art, and the invention is to be interpreted in light of the claims.

What is claimed is:

1. A system for supplying the pilot of an aircraft with an alternative source of aircraft attitude information comprising:

a plurality of sensors including:
a first sensor useful for sensing aircraft linear acceleration in a vertical direction;
a second sensor useful for sensing an airspeed of the aircraft;
a third sensor useful for sensing a roll rate and yaw rate of the aircraft and oriented on an inclined axis;
a fourth sensor useful for sensing a magnetic heading of the aircraft;

a signal processor, having an input coupled to said suite of sensors, and including:
a pitch angle estimator;
a roll angle estimator;
a heading angle estimator; and an output; and a display for displaying an angle estimation output from said signal processor to the pilot.

2. The system of claim 1 wherein said plurality of sensors further includes a pitch level sensor.

3. The system of claim 1 wherein said plurality of sensors further includes a sixth sensor useful for sensing a roll angle of the aircraft.

4. The system of claim 1 wherein said display comprises a mechanical indicating device visible to the pilot.

5. The system of claim 1 wherein said display comprises an electronic cockpit display.

6. The system of claim 1 wherein said signal processor comprises an analog circuit.

7. The system of claim 1 wherein said signal processor comprises a microprocessor.

8. The system of claim 1 wherein said second sensor and said first sensor comprise an air data computer.

9. The system of claim 1 wherein said display comprises a mechanical indicating device visible to the pilot.

10. The system of claim 1 wherein said display comprises an electronic cockpit display.

11. The system of claim 1 wherein said heading estimator comprises an analog circuit.

12. The system of claim 1 wherein said heading estimator comprises a microprocessor.

13. A roll angle estimator system for supplying an alternate source of aircraft roll angle information comprising:

a first sensor useful for sensing an aircraft airspeed data;

a second sensor useful for sensing a turn rate, oriented on an inclined axis;

a roll angle estimator having an input coupled to said first and second sensors and having an output;

a display, coupled to said roll angle estimator output, for displaying the roll angle information to the pilot.

14. The system of claim 13 wherein said display comprises an electronic cockpit display.

15. The system of claim 13 wherein said display comprises a mechanical indicating device visible to the pilot.

16. The system of claim 13 wherein said roll angle estimator comprises an analog circuit.

17. The system of claim 13 wherein said roll angle estimator comprises a microprocessor.

18. The system of claim 13 wherein said first sensor comprises an air data computer.

19. A pitch angle estimator system for supplying an alternate source of aircraft pitch angle information comprising:

a first sensor useful for sensing an aircraft roll angle;

a second sensor useful for sensing an aircraft linear acceleration along a vertical axis;

a third sensor useful for sensing an airspeed of the aircraft;

a pitch angle estimator having an input coupled to said first, said second and said third sensors, and having an output; and a display, coupled to said pitch angle estimator output, for displaying the pitch angle estimation to the pilot.

20. The system of claim 19 wherein said altitude sensor comprises an altimeter.

21. The system of claim 19 wherein said second sensor comprises an air data computer for sensing vertical acceleration pneumatically.

22. The system of claim 19 wherein said second sensor comprises a vertical speed indicator.

23. The system of claim 19 wherein said second sensor comprises a global positioning unit.

24. The system of claim 19 wherein said second sensor comprises an accelerometer.

25. The system of claim 19 further comprising a pitch attitude level sensor and wherein said output of said pitch attitude level sensor is coupled to said input of said pitch angle estimator.

26. The system of claim 19 wherein said display comprises a mechanical indicating device visible to the pilot.

27. The system of claim 19 wherein said display comprises an electronic cockpit display.

28. The system of claim 19 wherein said pitch angle estimator comprises an analog circuit.

29. The system of claim 19 wherein said pitch angle estimator comprises a microprocessor.

30. The system of claim 19 wherein said third sensor comprises an air data computer.

31. The system of claim 19 wherein said third sensors comprise a global positioning unit.

32. An apparatus for supplying an alternative source of aircraft attitude information comprising:

an input, adapted to receive a plurality of signals indicative of:

an aircraft linear acceleration in a vertical direction;

an airspeed of the aircraft;

an inclined turn rate sensor;

a yaw rate of the aircraft; and a magnetic heading of the aircraft;

an output; and a signal processor, disposed between and coupled to said input and to said output, for processing said plurality of signals and outputting at said output, an attitude estimate signal, wherein said attitude estimate signal includes at least one of a pitch angle estimate, a roll angle estimate or a heading angle estimate.

33. The apparatus of claim 32 wherein said signal processor further outputs a display control signal useful for controlling display of said attitude estimate signal on a cockpit display.

34. The apparatus of claim 32 wherein said signal processor comprises a microprocessor.

35. The apparatus of claim 32 wherein said signal processor comprises an analog circuit.

36. The apparatus of claim 32 further including an interface coupled to said signal processor and to said output for formatting said attitude estimate signal in a form useful by an avionics system contained aboard the aircraft.

37. An aircraft roll angle estimator for supplying an alternate source of aircraft roll angle information comprising:

an input adapted to receive a plurality of signals indicative of:

an aircraft airspeed;

a turn rate as measured on an inclined axis;

an output; and a signal processor, disposed between and coupled to said input and said output, for processing said plurality of signals and outputting at said output a roll angle estimate signal, wherein said signal processor includes a feedback loop logic having the form:

$$\hat{\Phi}(s) = G(s) \cdot \left( \frac{u}{s \cdot u \cdot \sin\Theta_G + g \cdot \cos\Theta_G} \right).$$

38. The apparatus of claim 37 wherein said signal processor further outputs a display control signal useful for controlling display of said heading angle estimate signal on a cockpit display.

39. The apparatus of claim 37 wherein said signal processor comprises a microprocessor.

40. The apparatus of claim 37 wherein said signal processor comprises an analog circuit.

41. The apparatus of claim 37 further including an interface coupled to said signal processor and to said output for formatting said roll angle estimate signal in a form useful by an avionics system contained aboard the aircraft.

42. A method for estimating aircraft pitch angle comprising the steps of:
   receiving an aircraft roll angle signal;
   receiving a first signal indicative of aircraft linear acceleration along a vertical axis;
   receiving an aircraft airspeed signal;
   receiving an aircraft pitch level signal;
   inputting said aircraft roll angle signal, said first signal, said airspeed signal and said pitch level signal into a feedback control loop having the form:

$$\hat{\Phi}(s) = G(s) \cdot \left( \frac{u}{s \cdot u \cdot \sin\Theta_G + g \cdot \cos\Theta_G} \right).$$

43. The method of claim 42 further comprising the step of receiving said roll angle signal from a roll angle estimator.

44. A method for supplying an alternative source of aircraft attitude information in the event of failure of the primary attitude sensing system comprising the steps of:
   receiving a plurality of signals indicative of:
      an aircraft linear acceleration in a vertical direction;
      an airspeed of the aircraft;
      a turn rate as measured on an inclined axis;
      a magnetic heading of the aircraft; and
      a pitch level sensor signal;
   using said signal indicative of airspeed of the aircraft and said signal indicative of turn rate as measured on an inclined axis to assert a roll angle estimate signal;
   using said roll angle estimate signal, said airspeed signal; said pitch level sensor signal, and said aircraft linear acceleration signal to assert a pitch angle estimate signal; and
   using said roll angle estimate signal; said magnetic heading signal and said yaw rate signal to assert a heading angle estimate signal.

45. The method of claim 44 further comprising the step of using said heading angle estimate signal, said pitch angle estimate signal and said roll angle estimate signal to display a heading, a pitch and a roll data to the pilot.

46. A computer program product for supplying aircraft heading information comprising:
   a computer readable storage medium having computer readable program code means embodied in said medium, said computer-readable program code means having:
      first computer instruction means for accessing a roll angle, a yaw rate and a magnetic heading data; and
      a second computer instruction means for estimating aircraft heading as a function of said roll angle, said yaw rate and said magnetic heading data.

47. A computer program product for supplying aircraft roll angle information comprising:
   a computer readable storage medium having computer readable program code means embodied in said medium, said computer readable program code means having:
      first computer instruction means for accessing an aircraft airspeed and a pitch angle rate data; and
      second computer instruction means for estimating aircraft roll angle as a function of said aircraft airspeed and pitch angle rate data.

48. A computer program product for supplying aircraft pitch angle information comprising:
   a computer readable storage medium having computer readable program code means embodied in said medium, said computer readable program code means having:
      first computer instruction means for accessing an aircraft roll angle, vertical acceleration and airspeed data; and
      second computer instruction means for estimating aircraft pitch angle as a function of said aircraft roll angle, vertical acceleration and said airspeed data.

49. A computer program product for supplying aircraft attitude information comprising:
   a computer readable storage medium having computer readable program code means embodied in said medium, said computer readable program code means having:
      first computer instruction means for accessing an aircraft vertical acceleration, an aircraft airspeed, a yaw rate, roll rate, and magnetic heading data; and
      second computer instruction means for estimating at least one of an aircraft roll angle, an aircraft pitch angle or an aircraft heading angle according to data accessed by said first computer instruction means.

* * * * *